United States Patent
Van Campenhout et al.

(10) Patent No.: US 9,482,816 B2
(45) Date of Patent: Nov. 1, 2016

(54) RADIATION COUPLER

(71) Applicant: IMEC VZW, Leuven (BE)

(72) Inventors: Joris Van Campenhout, Brussels (BE); Philippe Absil, Loupoigne (BE); Peter Verheyen, Nijlen (BE)

(73) Assignee: IMEC VZW, Leuven (BE)

( * ) Notice: Subject to any disclaimer, the term of this patent is extended or adjusted under 35 U.S.C. 154(b) by 0 days.

(21) Appl. No.: 14/560,909

(22) Filed: Dec. 4, 2014

(65) Prior Publication Data

US 2015/0177459 A1    Jun. 25, 2015

(30) Foreign Application Priority Data

Dec. 19, 2013    (EP) .................................... 13198498

(51) Int. Cl.
| | | |
|---|---|---|
| *G02B 6/12* | (2006.01) | |
| *G02B 6/124* | (2006.01) | |
| *G02B 6/42* | (2006.01) | |
| *G02B 6/34* | (2006.01) | |

(52) U.S. Cl.
CPC ................ *G02B 6/124* (2013.01); *G02B 6/34* (2013.01); *G02B 6/4214* (2013.01); *G02B 2006/12061* (2013.01); *G02B 2006/12104* (2013.01); *G02B 2006/12107* (2013.01); *G02B 2006/12147* (2013.01)

(58) Field of Classification Search
CPC .......... G02B 6/124; G02B 6/34; G02B 6/30; G02B 6/4214; G02B 2006/12061; G02B 2006/12107
See application file for complete search history.

(56) References Cited

U.S. PATENT DOCUMENTS

| | | |
|---|---|---|
| 2002/0192849 A1 | 12/2002 | Bullington et al. |
| 2005/0094939 A1 | 5/2005 | Ghiron et al. |
| 2005/0141808 A1 | 6/2005 | Cheben et al. |
| 2010/0092128 A1* | 4/2010 | Okayama ............... G02B 6/102 385/14 |

(Continued)

FOREIGN PATENT DOCUMENTS

CN    102 478 686 A    5/2012

OTHER PUBLICATIONS

Zaoui, Wissem Sfar et al., "Cost-Effective CMOS-Compatible Grating Couplers With Backside Metal Mirror and 69% Coupling Efficiency", Optics Express, vol. 20, No. 26, Dec. 10, 2012, pp. B238-B243.
Doerr, Christopher R. et al., "Wide Bandwidth Silicon Nitride Grating Coupler", IEEE Photonics Technology Letters, vol. 22, No. 19, Oct. 1, 2010, pp. 1461-1463.

(Continued)

*Primary Examiner* — Thomas A Hollweg
*Assistant Examiner* — Mary A El Shammaa
(74) *Attorney, Agent, or Firm* — McDonnell Boehnen Hulbert & Berghoff LLP

(57) ABSTRACT

Semiconductor photonics devices for coupling radiation to a semiconductor waveguide are described. An example photonics device comprises a semiconductor-on-insulator substrate comprising a semiconductor substrate, a buried oxide layer positioned on top of the semiconductor substrate, and the semiconductor waveguide on top of the buried oxide layer to which radiation is to be coupled. The example device also comprises a grating coupler positioned on top of the buried oxide layer and configured for coupling incident radiation to the semiconductor waveguide. The semiconductor substrate has a recessed portion at the backside of the semiconductor substrate for receiving incident radiation to be coupled to the semiconductor waveguide via the backside of the semiconductor substrate and the grating coupler.

16 Claims, 5 Drawing Sheets

(56) References Cited

U.S. PATENT DOCUMENTS

2010/0111473 A1* 5/2010 Pinguet .................. G02B 6/124
                                                            385/37
2010/0322555 A1* 12/2010 Vermeulen ......... G02B 6/12007
                                                            385/28
2011/0038588 A1   2/2011 Kim et al.
2011/0278441 A1* 11/2011 Vermeulen ............. G02B 6/124
                                                            250/227.23

OTHER PUBLICATIONS

Selvaraja, Shankar Kumar et al., "Highly Efficient Grating Coupler Between Optical Fiber and Silicon Photonic Circuit", Conference Paper, Conference on Lasers and Electro-Optics, Baltimore Maryland, U.S., May 31, 2009-Jun. 5, 2009, 2 pages.
Extended European Search Report and Opinion from European patent application No. 14198450.0-1553 mailed Apr. 28, 2015.

* cited by examiner

RADIATION COUPLER

CROSS-REFERENCE TO RELATED APPLICATIONS

This application claims priority to European Patent Application Serial No. 13198498.1 filed Dec. 19, 2013, the contents of which are hereby incorporated by reference in their entirety.

FIELD OF THE INVENTION

The present disclosure relates to the field of photonics. More particularly, the present disclosure relates to photonics devices and methods for coupling radiation from and to an integrated waveguide.

BACKGROUND

Photonics devices are widely prevalent in today's world. One issue in optical transport for optics communication, processing, or data transfer is efficiency when coupling radiation from one medium to another, e.g. from an optical fiber to a photonics device or vice versa. A number of coupling arrangements are available at present. One often used coupling element is a grating element. In order to optimise coupling efficiency, coupling materials and coupling configurations have been suggested.

Some systems make use of the silicon photonics platform. In the silicon photonics platform, use can be made of SiN as gratings in a SiN waveguide, having the benefit that SiN has low losses, low thermal dependency and high tolerance to fabrication errors. Furthermore, the silicon photonics platform offers the advantage that active devices can be easily incorporated. In order to increase the efficiency of the grating coupler, one suggestion is to use a mirror layer under a silicon photonics grating coupler below the buried oxide (BOX) layer of a silicon-on-insulator (SOI) wafer. It was demonstrated that this increases the coupling efficiency of the grating from a single mode fiber to a single mode silicon waveguide. Such a mirror can, for example, be a distributed Bragg reflector made of a series of alternating layers of materials having a large refractive index difference (for instance $SiO_2$ and Si or $SiO_2$ and SiN) or a reflective metal layer such as aluminum. The presence of the reflector increases the amount of light reflected at the BOX/Silicon substrate interface towards the grating, thus increasing the amount of light coupled. More particularly, only part of the light that hits the grating will couple to the waveguide while the other part will go through. When a reflector is present, the part going through the grating will be reflected back towards the grating having a second chance to couple.

Nevertheless, implementing the reflector below the buried oxide of the silicon-on-insulator, results in the fact that non-standard, custom made silicon-on-insulator wafers are to be used, rendering the manufacturing of the photonics device less trivial.

Alternative methods for increasing efficiency are known. In a first example, the coupling efficiency of the grating coupler is increased by applying a silicon grating by locally increasing the silicon waveguide thickness. Nevertheless, the latter requires tight control of the geometrical dimensions for controlling the grating spectral response. In another known example, a mirror is implemented under the grating by performing a substrate removal and metal deposition.

Consequently there is still a need for an efficient and easily manufacturable photonics coupling device.

SUMMARY

It is an object of the present disclosure to provide photonics devices for coupling radiation that combine good coupling efficiency with substantially easy manufacturability.

It is an advantage of embodiments of the present disclosure that, for manufacturing, use can be made of conventional semiconductor-on-insulator substrates, without need for complex processing steps.

It is an advantage of embodiments of the present disclosure that use can be made of the silicon photonics platform, allowing a high level of integration of components, e.g. active components, in the system.

It is an advantage of embodiments of the present disclosure that use can be made of systems suffering only little from thermal dependency, while not requiring complex manufacturing steps.

The above objective is accomplished by a method and device according to the present disclosure.

The present disclosure relates to a semiconductor photonics device for coupling radiation to a semiconductor waveguide, the photonics device comprising a semiconductor-on-insulator substrate comprising a semiconductor substrate, a buried oxide layer positioned on top of the semiconductor substrate, and the semiconductor waveguide on top of the buried oxide layer to which radiation is to be coupled. The photonics device also comprises a grating coupler positioned on top of the buried oxide layer and configured for coupling incident radiation to the semiconductor waveguide. The semiconductor substrate has a recessed portion at the backside of the semiconductor substrate for receiving incident radiation to be coupled to the semiconductor waveguide via the backside of the semiconductor substrate and the grating coupler. It is to be noticed that the optical path can be reversed and therefore the device is equally suitable for coupling radiation from the semiconductor waveguide, via the grating coupler out and the backside of the semiconductor substrate.

It is an advantage of embodiments of the present disclosure that by coupling radiation from the backside of the SOI substrate one can make use of standard SOI wafers for the manufacturing of the photonics device. It is an advantage of embodiments of the present disclosure that good efficiency of the photonics device is obtained.

The photonics device furthermore may comprise a reflector positioned on top of the grating coupler for reflecting radiation that has not interacted with the grating coupler during the first pass. By reflecting the radiation back to the grating coupler, a higher coupling efficiency can be obtained. It is an advantage of embodiments of the present disclosure that avoiding introduction of the mirror between the basic substrate and the buried oxide layer, allows to make use of an efficient system, without the need for complex manufacturing steps. In prior art, manufacturing typically requires the deposition of multiple layers prior to performing the silicon layer transfer. As the layers need to be deposited and cannot be grown on the substrate, the bonding process and wafer splitting process are more difficult resulting in lower bonding quality, higher defect counts, and excessive wafer bowing. In these approaches, use cannot be made of off-the-shelf substrates and custom made substrates are required. Due to their specific arrangements, use can be made from off-the-shelf substrates for manufacturing devices according to embodiments of the present disclosure.

It is an advantage of embodiments of the present disclosure that radiation can be coupled in via a thinned substrate portion, as this increases the overall coupling efficiency as more radiation will reach the grating coupler.

The recessed portion at the backside of the semiconductor substrate may have a thickness of less than 50 µm. In order to have close proximity for coupling of radiation, the recessed portion may be as thin as possible, without or only with limited hampering of the mechanical stability of the substrate.

The waveguide coupler may be a SiN waveguide coupler. It is an advantage of embodiments of the present disclosure that these allow the use of SiN couplers in the devices as SiN is subject to low losses, has a low thermal dependency, and has a high tolerance to fabrication variation. It is an advantage of embodiments according to the present disclosure that SiN gratings have a substantially large bandwidth.

The semiconductor-on-insulator substrate may be a silicon-on-insulator substrate and the semiconductor waveguide may be a silicon waveguide. It is an advantage of embodiments of the present disclosure that the silicon photonics platform offers a platform for active devices such as modulators and detectors, thus allowing a high level of integration.

The reflector may be a distributed Bragg reflector. It is an advantage of embodiments of the present disclosure that use can be made of a well-known and efficient reflector.

The distributed Bragg reflector may comprise a stack of alternating $SiO_2$ and Si layers or a stack of alternating $SiO_2$ and SiN layers. In embodiments of the present disclosure, as the structure is used inversely with respect to conventional structures, the reflector, e.g. the distributed Bragg reflector, can be provided on top of the substrate, the grating coupler and the waveguide, so that it can be applied with conventional deposition techniques, without the need for first removing other materials.

The reflector may be a reflective metal layer, such as for example an aluminum layer.

The present disclosure also relates to an optical system, the optical system comprising at least one photonics device as described above and at least one active device integrated in the photonics device.

The system furthermore may comprise an optical fiber for being positioned near or in a recessed portion of the photonics device for coupling radiation between the optical fiber to the semiconductor waveguide.

The present disclosure also relates to a method for coupling radiation to a semiconductor waveguide, the method comprising providing incident radiation, incident via a backside of a semiconductor on insulator substrate, coupling radiation via a grating coupler to a semiconductor waveguide, the grating coupler and the semiconductor waveguide being positioned at a front side of the semiconductor-on-insulator-substrate. The method also may comprise reflecting radiation that was not coupled by the grating coupler at a reflector positioned on top of the grating coupler. It is an advantage of embodiments according to the present disclosure that efficient radiation coupling can be performed as radiation, not coupled by the grating coupler when the radiation is first incident, is reflected again to the coupler, resulting in a further interaction of the radiation with the grating coupler.

Providing incident radiation may comprise providing incident radiation at a recessed portion via the backside of the semiconductor-on-insulator substrate.

The present disclosure also relates to a method for coupling radiation to an optical fiber from a semiconductor waveguide, the method comprising providing an incident radiation wave in a semiconductor waveguide, coupling radiation coming from the semiconductor waveguide via a grating coupler through the semiconductor-on-insulator substrate, and receiving the radiation coupled through the semiconductor-on-insulator substrate in the optical fiber positioned at the backside of the semiconductor-on-insulator substrate.

Receiving the radiation in the optical fiber may comprise positioning the optical fiber in a recess at the backside of the semiconductor-on-insulator substrate.

The present disclosure also relates to a method for manufacturing a photonics device suitable for coupling radiation to a semiconductor waveguide, the method comprising obtaining a semiconductor-on-insulator substrate comprising a semiconductor substrate, a buried oxide layer positioned on top of the semiconductor substrate and a semiconductor waveguide on top of the buried oxide layer to which radiation is to be coupled, providing a grating coupler in or on an upper layer of the semiconductor-on-insulator substrate at a front side of the semiconductor-on-insulator substrate, and providing a recess in the semiconductor substrate of the semiconductor-on-insulator substrate at the backside of the semiconductor-on-insulator substrate.

The method furthermore may comprise providing a reflector at a front side of the semiconductor-on-insulator substrate, the reflector overlaying the grating coupler and being suitable for reflecting radiation incident via the backside of the semiconductor substrate and hitting the reflector without being coupled first to the semiconductor waveguide.

Particular and preferred aspects of the disclosure are set out in the accompanying independent and dependent claims. Features from the dependent claims may be combined with features of the independent claims and with features of other dependent claims as appropriate and not merely as explicitly set out in the claims.

These and other aspects of the disclosure will be apparent from and elucidated with reference to the embodiment(s) described hereinafter.

Figure 1:
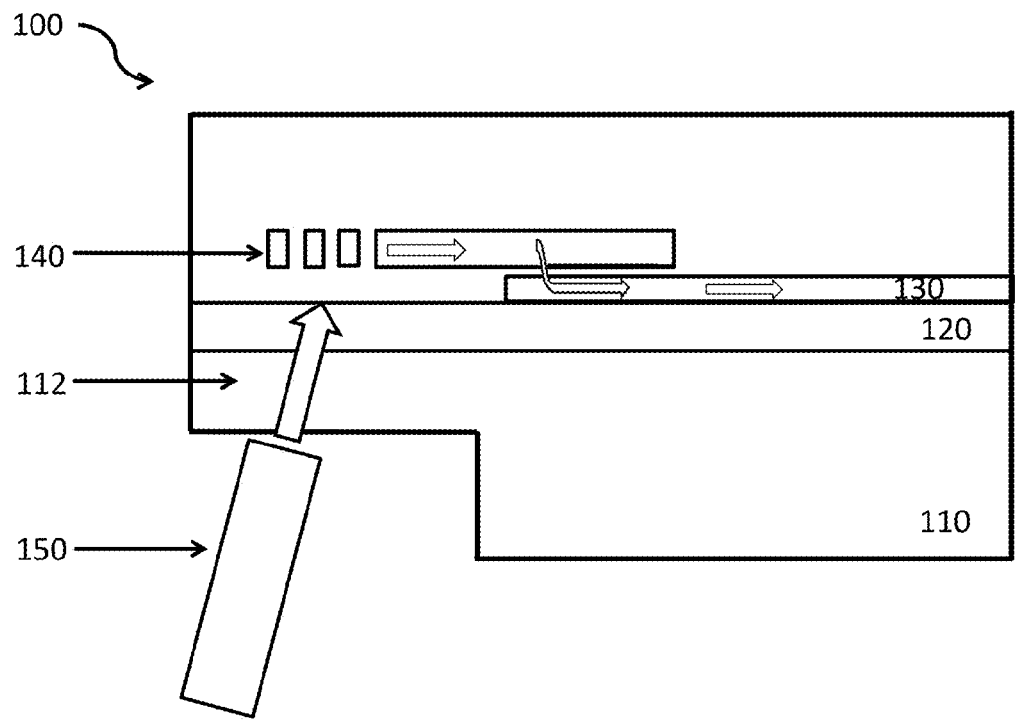
FIG. 1 illustrates an example photonic device for backside radiation coupling according to an embodiment of the present disclosure.

The drawings are only schematic and are non-limiting. In the drawings, the size of some of the elements may be exaggerated and not drawn on scale for illustrative purposes.

DETAILED DESCRIPTION

The present disclosure will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the disclosure described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the disclosure described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present disclosure, the only relevant components of the device are A and B.

Reference throughout this specification to "one embodiment" or "an embodiment" means that a particular feature, structure or characteristic described in connection with the embodiment is included in at least one embodiment of the present disclosure. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the disclosure, various features of the disclosure are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those in the art. For example, in the following claims, any of the claimed embodiments can be used in any combination.

In the description provided herein, numerous specific details are set forth. However, it is understood that embodiments of the disclosure may be practiced without these specific details. In other instances, well-known methods, structures and techniques have not been shown in detail in order not to obscure an understanding of this description.

Where in embodiments of the present disclosure reference is made to a photonics device, reference is made to a device made using a photonics platform based on for example semiconductor-on-insulator substrates such as silicon-on-insulator substrates, integrated waveguides based on for example silicon, germanium, silicon germanium, silicon nitride, silicon carbide, etc. Advantageously a photonics device according to embodiments of the present disclosure is based on a silicon-on-insulator substrate in a silicon photonics platform, which is a very interesting material system for highly integrated photonic circuits. The high refractive index contrast allows photonic waveguides and waveguide components with submicron dimensions to guide, bend and control light on a very small scale so that various functions can be integrated on a chip. Such waveguides allow a high level of miniaturization, which is advantageous. Furthermore for such waveguide types radiation can be efficiently coupled in and out the photonics integrated circuit. Using silicon-on-insulator also has some technological advantages. Due to the CMOS industry, silicon technology has reached a level of maturity that outperforms any other planar chip manufacturing technique by several orders of magnitude in terms of performance, reproducibility, throughput and cost. Nano-photonic ICs can be fabricated with wafer scale-processes, which means that a wafer can contain a large number of photonic integrated circuits.

When in embodiments of the present disclosure reference is made to an active device, reference is made to at least one component such as for example an integrated detector or an integrated radiation source or an integrated modulator. Other components also can be easily integrated in a photonics device made in a silicon photonics platform, such as for example an integrated optical cavity, an integrated optical resonator, an integrated optical coupler, a waveguide, a taper, a tunable filter, a phase-shifter, a modulator or a combination thereof.

Where in embodiments according to the present disclosure reference is made to the backside of a semiconductor substrate, reference is made to the opposite side of the semiconductor substrate than the side where the waveguide is present. In embodiments of the present disclosure this corresponds with the side of the substrate where the BOX is deposited.

Where in embodiments according to the present disclosure reference is made to a grating coupler, reference is made to a coupler for coupling incident radiation from one direction into another direction, e.g. into an optical element by guiding radiation in another direction. Such a grating coupler may be based on a periodic structure. It may have periodicity in one direction, periodicity in two directions, etc.

In a first aspect, embodiments of the present disclosure relate to a semiconductor photonics device for a coupling radiation to or from a semiconductor waveguide. Such coupling may be performed, for example, to or from an optical fiber or to or from free space. The photonics device may comprise a semiconductor-on-insulator substrate comprising a semiconductor substrate, a buried oxide layer positioned on top of the semiconductor substrate, and the semiconductor waveguide on top of the buried oxide layer. Such a semiconductor-on-insulator substrate may be fully based on a conventionally available semiconductor-on-insulator substrates. More particularly, it is an advantage of embodiments of the present disclosure that for manufacturing the photonics device, a conventional semiconductor-on-insulator substrate may be used, without the need for too much complex processing for altering the existing layer of the substrate. The function of the photonics device may be to couple radiation from or to the semiconductor waveguide. According to embodiments of the present disclosure, the photonics device may furthermore comprise a grating coupler positioned on top of the buried oxide layer and configured for coupling incident radiation to or from the semiconductor waveguide. Furthermore, according to embodiments, the semiconductor substrate has a recessed portion at the backside of the semiconductor substrate for receiving incident radiation to be coupled to the semiconductor waveguide via the backside of the semiconductor substrate and the grating coupler. In view of reversibility of optical path, the device can also be used to couple, via the recess radiation from the semiconductor waveguide over the grating coupler via the backside of the semiconductor substrate radiation to an optical fiber, e.g. positioned in the recess, or to free space.

Figure 2:
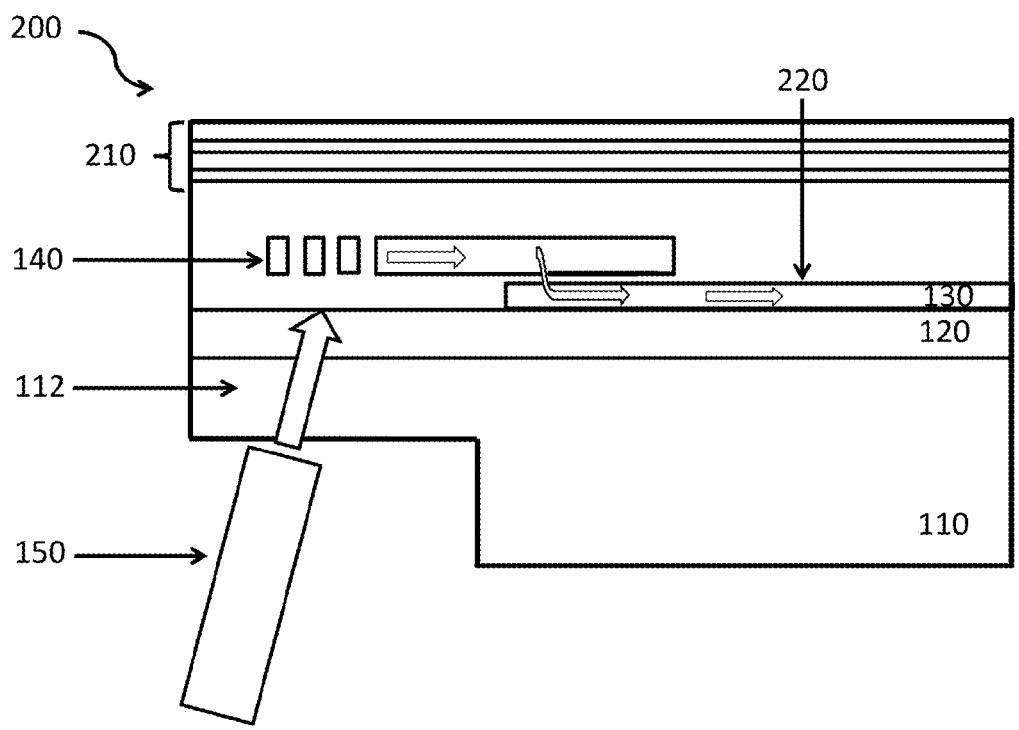
FIG. 2 illustrates an example photonic device for backside radiation coupling comprising furthermore a reflector above the semiconductor waveguide for reflecting radiation that was not coupled yet, according to an embodiment of the present disclosure.

By way of illustration, embodiments of the present disclosure not being limited thereto, advantages and standard and optional features of particular embodiments of the present disclosure will be described with reference to FIGS. 1 and 2. FIG. 1 illustrates a photonics device 100 according to an embodiment where no additional reflector is present, whereas in FIG. 2, a similar photonics device 200 is shown, but an additional reflector 210 is introduced for increasing the coupling efficiency.

The photonics devices 100 and 200 of the particular examples are based on semiconductor-on-insulator substrates 110. Such SOI substrates 110 may be any type of SOI substrate. Nevertheless, advantageously silicon-on-insulator substrates can be used as they are readily available, have good properties for integrating optical active devices, and provide a well-developed platform. The SOI substrates 110 may comprise a semiconductor substrate which may be made of any suitable semiconductor material, e.g. being germanium but in the present examples being silicon substrates, supporting a buried oxide layer 120. The semiconductor substrate may comprise a recess introduced from the backside. Such a recess allows coupling of radiation through the backside of the semiconductor substrate towards or from optical components positioned at the other side of the semiconductor substrate.

The thickness of the semiconductor substrate at not-recessed portions may be between 650 µm and 800 µm for conventional SOI substrates. In order to allow close proximity for the radiation coupling, advantageously the recessed portion 112, where the substrate is thinned, has a thickness below 50 µm, e.g. in the range 0 µm to 50 µm. Advantageously the thickness is selected to provide sufficient strength but also close proximity for the radiation coupling. The recessed portion is in area sufficiently large to cover the grating area of the grating that will be discussed further. More generally, the recessed portion may be large enough to couple all radiation in the radiation spot incident on the substrate towards the semiconductor waveguide. The recessed portion can be introduced by processing the substrate in any suitable way such as for example by etching, grinding, milling, laser processing such as laser ablation, etc. On top of the semiconductor substrate 110, as described above, a buried oxide layer 120 is provided.

The buried oxide layer 120 may have a thickness in the range 1 µm to 4 µm. In one example, where the SOI is a silicon-on-insulator substrate, the buried oxide layer is a silicon oxide layer. On top of the buried oxide layer 120, a semiconductor layer is present, wherein, according to embodiments of the present disclosure, a semiconductor waveguide 130 is positioned. The semiconductor waveguide 130 in one particular example is a silicon waveguide. It is an advantage of at least some embodiments according to the present disclosure that a silicon waveguide is used, as this allows introduction of optional active components. Examples of such active components are detectors—the photonics device then may be suitable for coupling radiation into the waveguide—, radiation sources such as for example integrated radiation sources like integrated lasers—the photonics device then may be suitable for coupling radiation out of the device—, optical modulators, etc. Such active components also may be introduced in other platforms, but the silicon photonics platform advantageously has been developed already so that good techniques are known for manufacturing or introduction of these components. As indicated above, also more passive components can be present in or near the semiconductor waveguide. An example position where components may be introduced is shown in FIG. 2 by arrow 220.

According to embodiments of the present disclosure, the device 100 furthermore comprises a grating coupler 140 for coupling incident radiation from or to the semiconductor waveguide 130. Such a grating coupler 140 may have a periodic structure and can have a one-dimensional periodicity or a two-dimensional periodicity. According to embodiments of the present disclosure the grating coupler 140 also may have other features. The grating coupler 140 may be an apodized grating. In embodiments of the present disclosure, the grating coupler 140 may be made using silicon nitride as a guiding layer. The grating coupler may be a periodic structure in a SiN waveguide. The grating coupler may then couple to the semiconductor waveguide.

In particular embodiments according to the present disclosure, the photonics device furthermore comprises a reflector positioned above the grating coupler. Such a reflector may be any type of reflector reflecting radiation that was not coupled to the waveguide during the first pass at the grating coupler, back into the direction of the grating coupler. In this way, the chance for coupling is increased and the efficiency of the photonics device coupler is increased as well. In particular embodiments, the reflector may be a distributed Bragg reflector (DBR). One example of a DBR is a stack of alternating $SiO_2$ and Si layers or a stack of alternating $SiO_2$ and SiN layers. Another example of a reflector is a metal layer, e.g. an aluminum layer.

Figure 3:
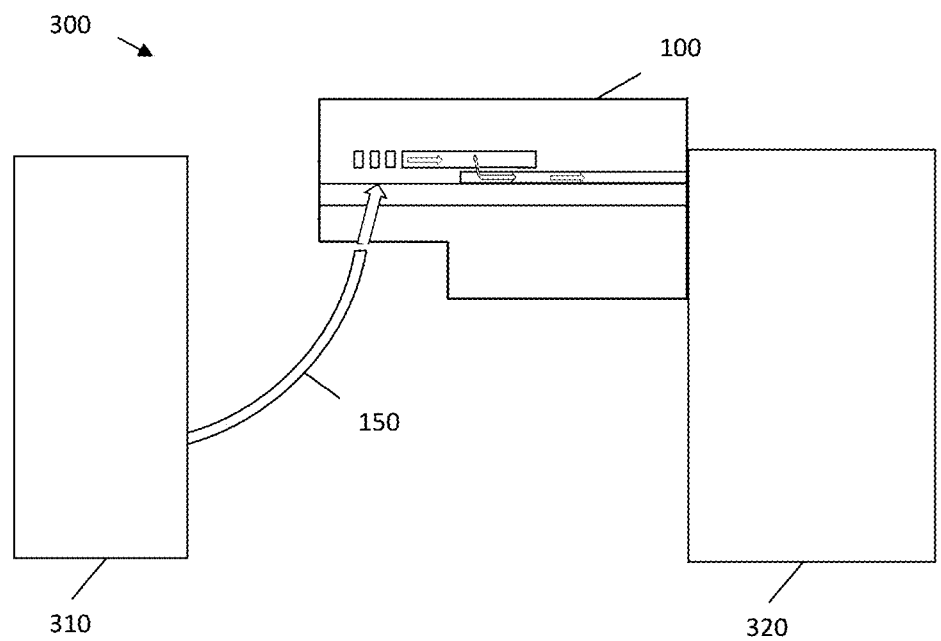
FIG. 3 illustrates an example optical system comprising a photonics device according to an embodiment of the present disclosure.

In another aspect, the present disclosure relates to an optical system for handling radiation. The optical system comprises a photonics device as described in the first aspect and furthermore comprises an optical fiber, positioned in the recess of the photonics device and adapted for providing a radiation beam to be coupled to the semiconductor waveguide in the photonics device via the backside of the semiconductor substrate. The optical fiber may be coupled to the recessed portion of the substrate. Such a coupling may be made using any suitable means such as for example using an optical glue. The optical fiber may be coupled at one side with the photonics device and at the other side directly or indirectly with a radiation source or a detector for detecting radiation. The optical system furthermore may comprise additional optical components. As described above, also a number of components, active or passive, may be present in the photonics device. Optical systems that benefit from embodiments according to the present disclosure may be any type of optical system, such as for example an optical detection system, an optical communication system, an optical data processing system, etc. By way of illustration, embodiments of the present disclosure not being limited thereto, an example of an optical system 300 is shown in FIG. 3, indicating a first optical subsystem 310, an optical fiber 150 optically linking the first optical subsystem 310 with a photonics device 100 which links with a second optical subsystem 320.

In yet a further aspect, the present disclosure relates to a method for coupling radiation to a semiconductor waveguide. According to embodiments, the method comprises providing incident radiation, incident via a backside of a semiconductor on insulator substrate, coupling the radiation via a grating coupler to a semiconductor waveguide, the grating coupler being positioned at a front side of the semiconductor on insulator substrate. In some embodiments, the provision of radiation incident via a backside of the semiconductor-on-insulator may be provision of radiation in a recessed portion of the substrate at the backside of the substrate in the semiconductor on insulator substrate. In some particular embodiments, the method also comprises reflecting radiation that was not coupled by the grating coupler back to the grating coupler. For such reflecting, a reflector positioned on top of the grating coupler may be used. The method furthermore may comprise steps expressing the functionality of components of the photonics device or of the optical system.

In still a further aspect, the present disclosure relates to a method for coupling radiation to an optical fiber from a semiconductor waveguide. The method comprises providing an incident radiation wave in a semiconductor waveguide, coupling radiation coming from the semiconductor waveguide via a grating coupler through the semiconductor-on-insulator substrate, and receiving the radiation coupled through the semiconductor-on-insulator substrate in the optical fiber positioned at the backside of the semiconductor-on-insulator substrate. In particular embodiments, the optical fiber may be positioned in a recess at the backside of the semiconductor-on-insulator substrate. In other embodiments, the method may comprise redirecting radiation that has been directed by the grating coupler to the front side of the semiconductor-on-insulator substrate by reflecting it back in the direction of the backside of the semiconductor-on-insulator substrate. The method furthermore may comprise steps expressing the functionality of components of the photonics device or of the optical system.

In one aspect, the present disclosure relates to a method for manufacturing a photonics device suitable for coupling radiation to a semiconductor waveguide. The method comprises obtaining a semiconductor-on-insulator substrate comprising a semiconductor substrate, a buried oxide layer positioned on top of the semiconductor substrate, and a semiconductor waveguide on top of the buried oxide layer to which radiation is to be coupled. It is an advantage of embodiments of the present disclosure that conventional semiconductor-on-insulator substrates can be used. Alternatively, a semiconductor-on-insulator substrate also may be manufactured using for example conventional semiconductor processing techniques.

The method also comprises providing a grating coupler in or on an upper layer of the semiconductor-on-insulator substrate at a front side of the semiconductor-on-insulator substrate. Producing a grating coupler, e.g. a SiN grating coupler on a silicon-on-insulator substrate, can be performed using conventional semiconductor processing techniques. The method also comprises providing a recess in the semiconductor substrate of the semiconductor-on-insulator substrate at the backside of the semiconductor-on-insulator substrate. Such a recess may be obtained using any suitable technique, such as for example laser ablation, milling, grinding, etching, etc. The method furthermore may comprise providing a reflector at a front side of the semiconductor-on-insulator substrate, the reflector overlaying the grating coupler and being suitable for reflecting radiation incident via the backside of the semiconductor substrate and hitting the reflector without being coupled first to the semiconductor waveguide. Providing a reflector may be performed using conventional semiconductor processing techniques.

FIGS. 4a to 4f illustrate example intermediate states of the device during the manufacturing of the photonics device according to an exemplary method according to an embodiment of the present disclosure, illustrating standard and optional features of a manufacturing process.

Figure 4A:
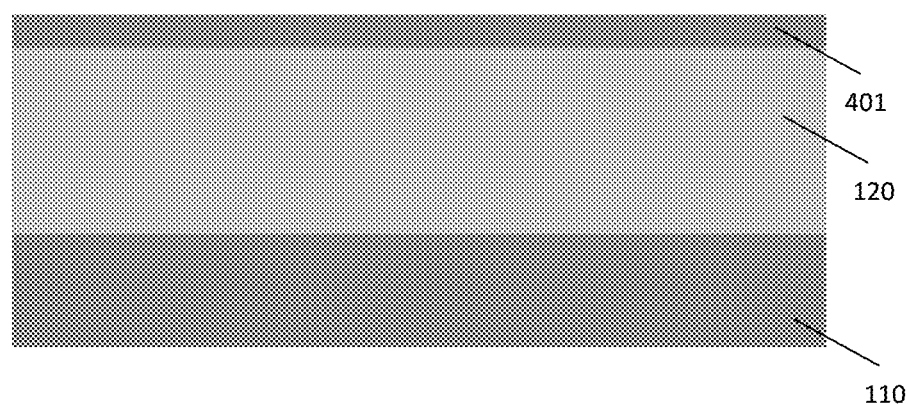
FIGS. 4a through 4f illustrate examples of the different intermediate states during the manufacturing of a photonic device in an exemplary manufacturing method according to an embodiment of the present disclosure.

In a first step, a semiconductor-on-insulator substrate is obtained. It thereby is an advantage of embodiments of the present disclosure that the substrate may be an off-the-shelf substrate. Nevertheless, alternatively the semiconductor-on-insulator substrate also may be obtained by manufacturing using a number of processing steps, known by the person skilled in the art. The semiconductor-on-insulator substrate is shown in FIG. 4a. The semiconductor substrate 110, in the present example being a Si substrate, the buried oxide layer 120, in the present example being a SiO2 layer, and the semiconductor layer 401 wherein the semiconductor waveguide 130 will be formed, in the present example being a Si layer, are shown.

Figure 4B:
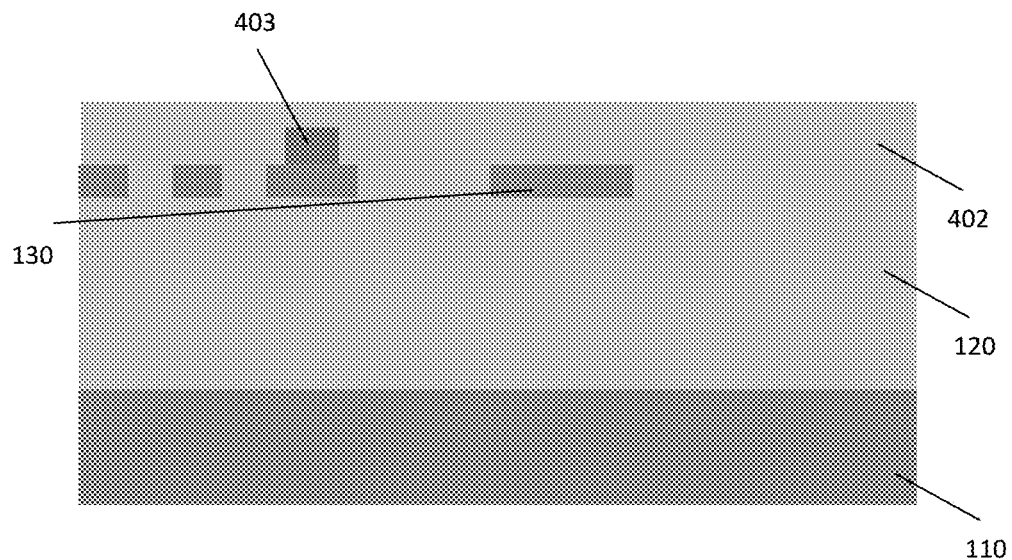

In a second step, the waveguide 130 as well as possible active components are formed. Methods for forming such a waveguide are as such well known to the person skilled in the art and will not be further described in detail. The resulting waveguide 130 is shown in FIG. 4b. Additional layers introduced during the processing are also shown. This includes in the present example a Ge component 403 as well as additional layers 402 which may be used as cladding layers for the waveguide are also shown.

Figure 4C:
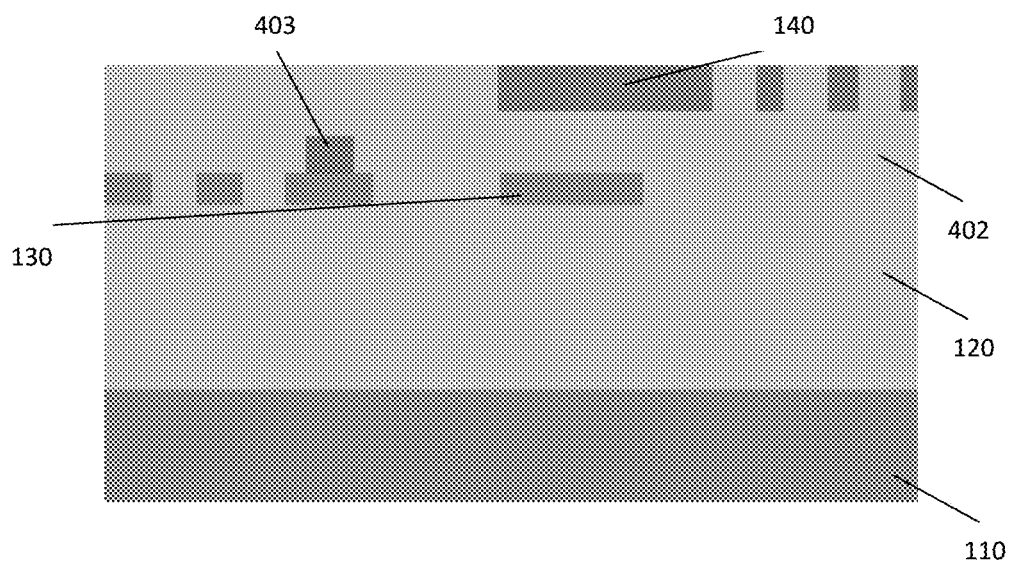

In a following step, the grating coupler 140, in the present example being a SiN grating coupler, is introduced. The grating coupler 140 is shown in FIG. 4c.

Figure 4D:
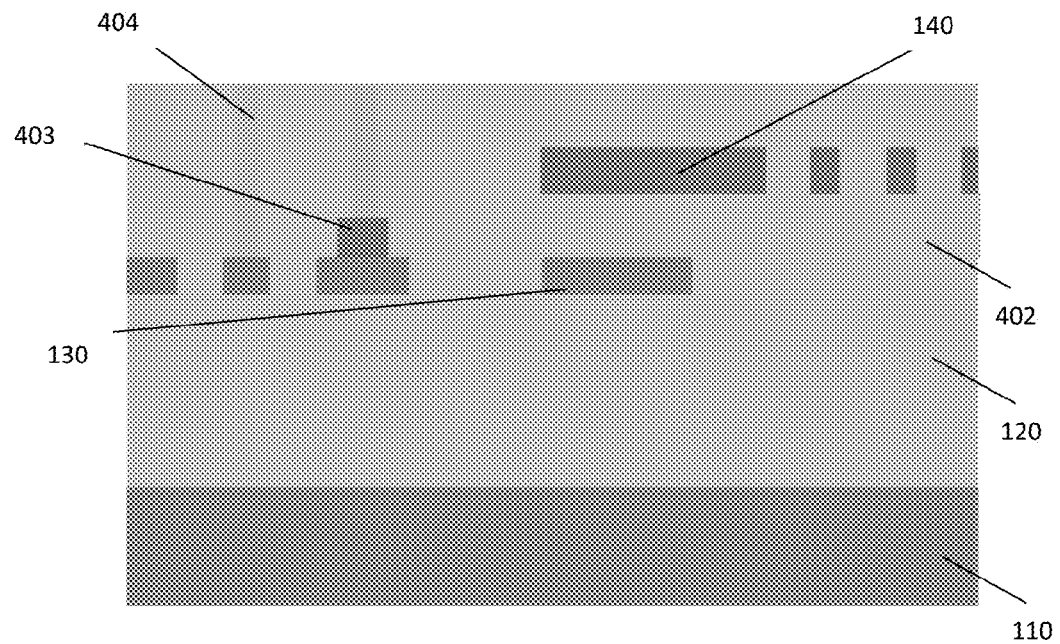

In a further optional step, electrical contacts 404 are provided for contacting the active components, e.g. radiation source or detector. These are shown in FIG. 4d.

Figure 4E:
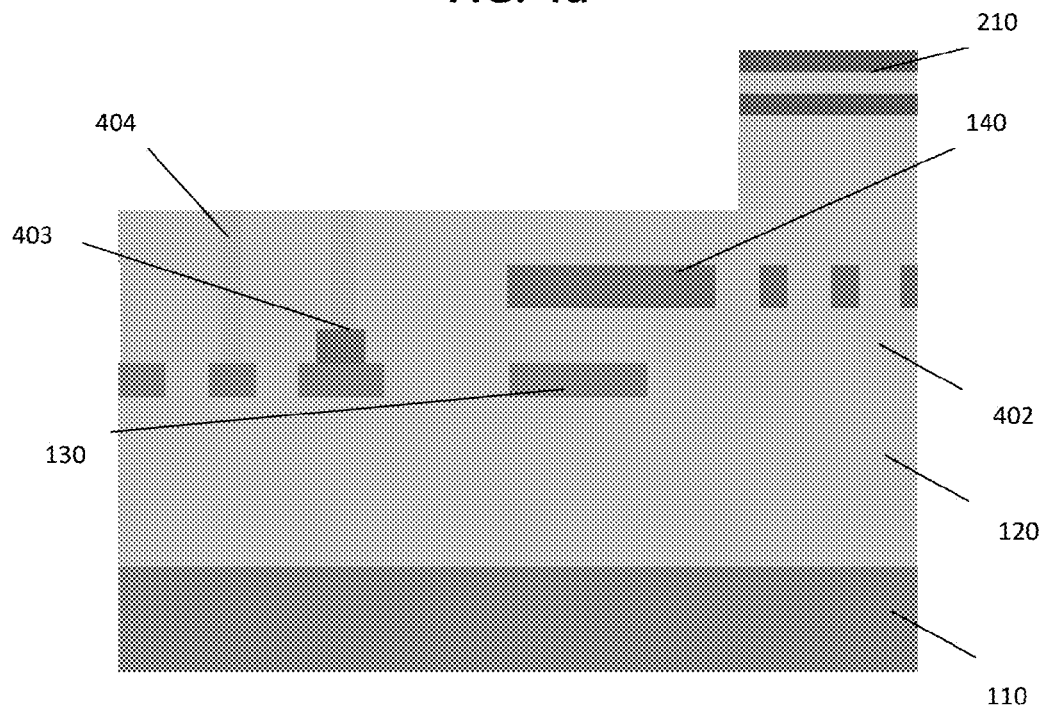

In yet a further optional step, the reflector 210 is introduced. In the present case, the reflector is a DBR reflector positioned above the SiN grating coupler 140, as can be seen in FIG. 4e.

Figure 4F:
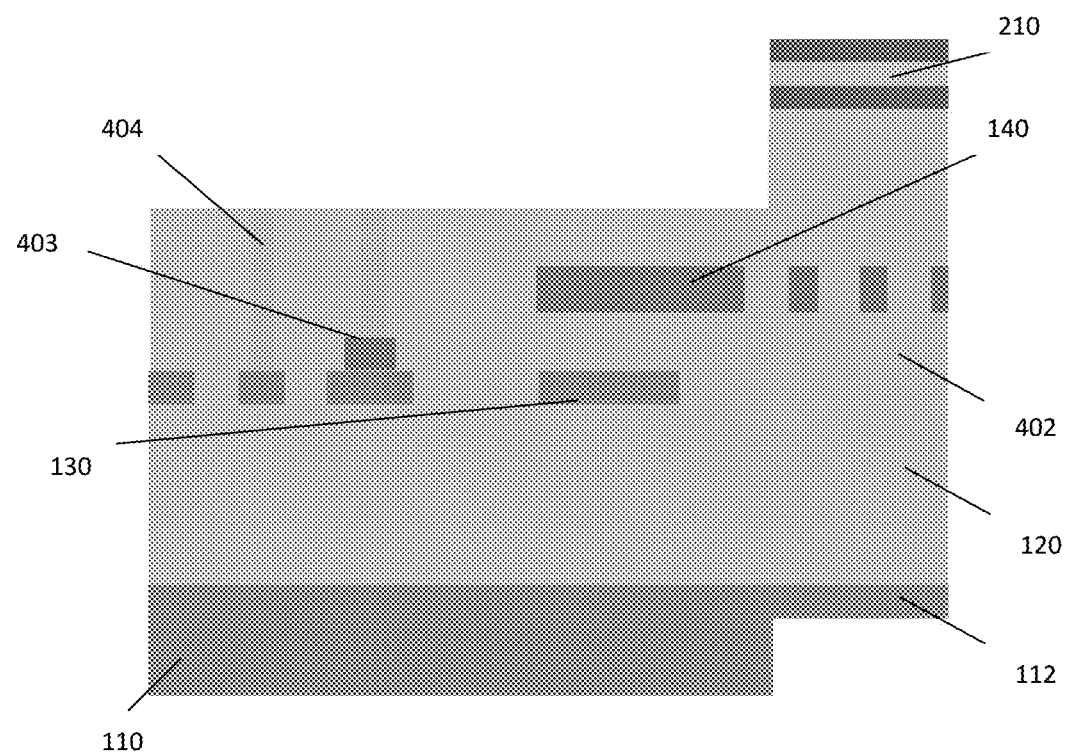

In a final step, the recess is produced in the backside of the substrate 110, resulting in a recessed portion 112. The latter is seen in FIG. 4f.

The above illustrates an exemplary flow for manufacturing a photonics device, but it will be understood by the person skilled in the art that other processing steps and

What is claimed is:

1. A semiconductor photonics device for coupling radiation to a semiconductor waveguide, the semiconductor photonics device comprising:
 a semiconductor-on-insulator substrate comprising:
  a semiconductor substrate,
  a buried oxide layer positioned on top of the semiconductor substrate, and
  a semiconductor layer positioned on top of the buried oxide layer,
  wherein the semiconductor layer comprises a semiconductor waveguide to which radiation is to be coupled; and
 a SiN grating coupler positioned above the buried oxide layer and comprising a SiN guiding layer, wherein the SiN guiding layer is positioned above the semiconductor layer, and wherein the SiN grating coupler is configured for coupling incident radiation to the semiconductor waveguide,
 wherein the semiconductor substrate has a recessed portion at the backside of the semiconductor substrate for receiving incident radiation to be coupled to the semiconductor waveguide via the backside of the semiconductor substrate and the SiN grating coupler.

2. The semiconductor photonics device according to claim 1, further comprising a reflector positioned on top of the SiN grating coupler for reflecting radiation that has not interacted with the SiN grating coupler during a first pass.

3. The semiconductor photonics device according to claim 2, wherein the reflector is a distributed Bragg reflector or a metal reflector.

4. The semiconductor photonics device according to claim 3, wherein the reflector is a distributed Bragg reflector comprising a stack of alternating $SiO_2$ and Si layers or a stack of alternating $SiO_2$ and SiN layers.

5. The semiconductor photonics device according to claim 1, wherein the recessed portion at the backside of the semiconductor substrate has a thickness of less than 50 µm.

6. The semiconductor photonics device according to claim 1, wherein the semiconductor-on-insulator substrate is a silicon-on-insulator substrate, and wherein the semiconductor waveguide is a silicon waveguide.

7. The semiconductor photonics device according to claim 6, wherein the SiN guiding layer is separated from the silicon waveguide by a cladding layer.

8. An optical system, the optical system comprising:
 a semiconductor photonics device comprising:
  a semiconductor-on-insulator substrate comprising a semiconductor substrate, a buried oxide layer positioned on top of the semiconductor substrate, and a semiconductor layer positioned on top of the buried oxide layer, wherein the semiconductor layer comprises a semiconductor waveguide to which radiation is to be coupled, and
  a SiN grating coupler positioned above the buried oxide layer and comprising a SiN guiding layer, wherein the SiN guiding layer is positioned above the semiconductor layer, and wherein the SiN grating coupler is configured for coupling incident radiation to the semiconductor waveguide,
  wherein the semiconductor substrate has a recessed portion at the backside of the semiconductor substrate for receiving incident radiation to be coupled to the semiconductor waveguide via the backside of the semiconductor substrate and the SiN grating coupler; and
 an active device integrated in the semiconductor photonics device.

9. The optical system according to claim 8, further comprising an optical fiber positioned near or in the recessed portion of the semiconductor photonics device for coupling radiation between the optical fiber to the semiconductor waveguide.

10. The optical system according to claim 8, wherein the semiconductor photonics device further comprises a reflector positioned on top of the SiN grating coupler for reflecting radiation that has not interacted with the SiN grating coupler during a first pass.

11. The optical system according to claim 10, wherein the reflector is a distributed Bragg reflector or a metal reflector.

12. The optical system according to claim 8, wherein the recessed portion at the backside of the semiconductor substrate has a thickness of less than 50 µm.

13. A method for manufacturing a semiconductor photonics device suitable for coupling radiation to a semiconductor waveguide, the method comprising:
 obtaining a semiconductor-on-insulator substrate comprising a semiconductor substrate, a buried oxide layer positioned on top of the semiconductor substrate, and a semiconductor layer positioned on top of the buried oxide layer;
 forming a semiconductor waveguide on top of the buried oxide layer;
 providing a SiN grating coupler comprising a SiN guiding layer, wherein the SiN guiding layer is provided above the semiconductor layer; and
 providing a recess in the semiconductor substrate of the semiconductor-on-insulator substrate at the backside of the semiconductor-on-insulator substrate.

14. The method according to claim 13, further comprising providing a reflector at the front side of the semiconductor-on-insulator substrate, the reflector overlaying the SiN grating coupler and being suitable for reflecting radiation incident via the backside of the semiconductor substrate and hitting the reflector without being coupled first to the semiconductor waveguide.

15. The method according to claim 14, wherein the reflector comprises a distributed Bragg reflector or a metal reflector.

16. The method according to claim 13, wherein the recess has a thickness of less than 50 µm.

* * * * *